INVENTOR.
Rudolph J. Gerber

Jan. 13, 1959 R. J. GERBER 2,867,907
PORTABLE LINOLEUM MEASURING AND CUTTING DEVICE
Filed April 26, 1955 5 Sheets-Sheet 2
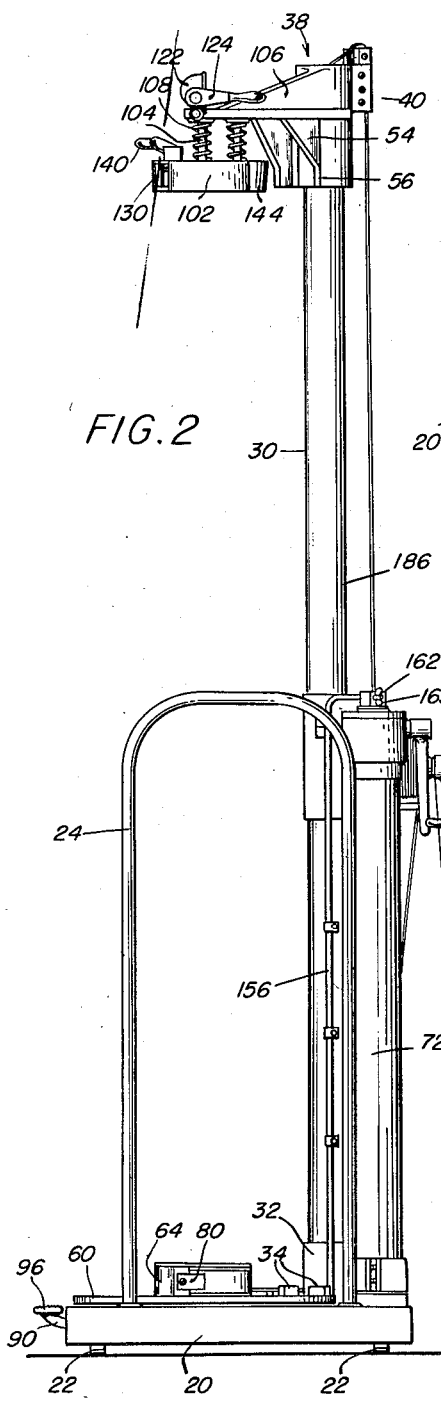
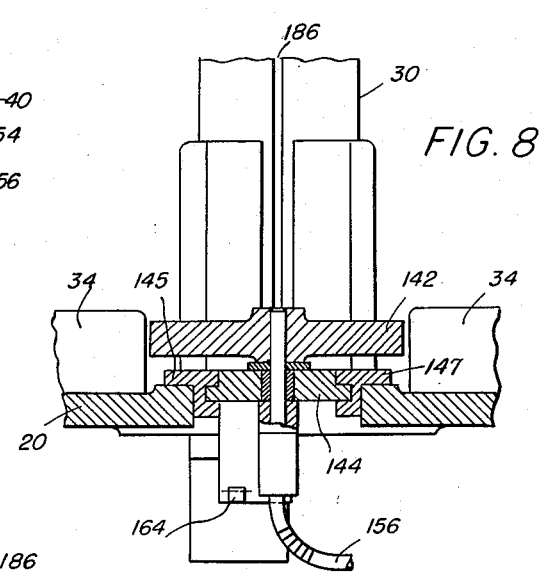
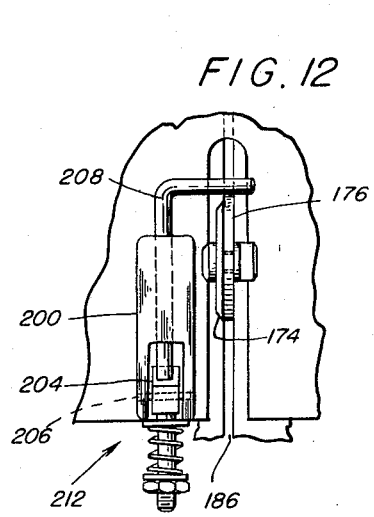
INVENTOR.
Rudolph J. Gerber
BY
Churchill, Rich, Weymouth & Engel
Attorneys

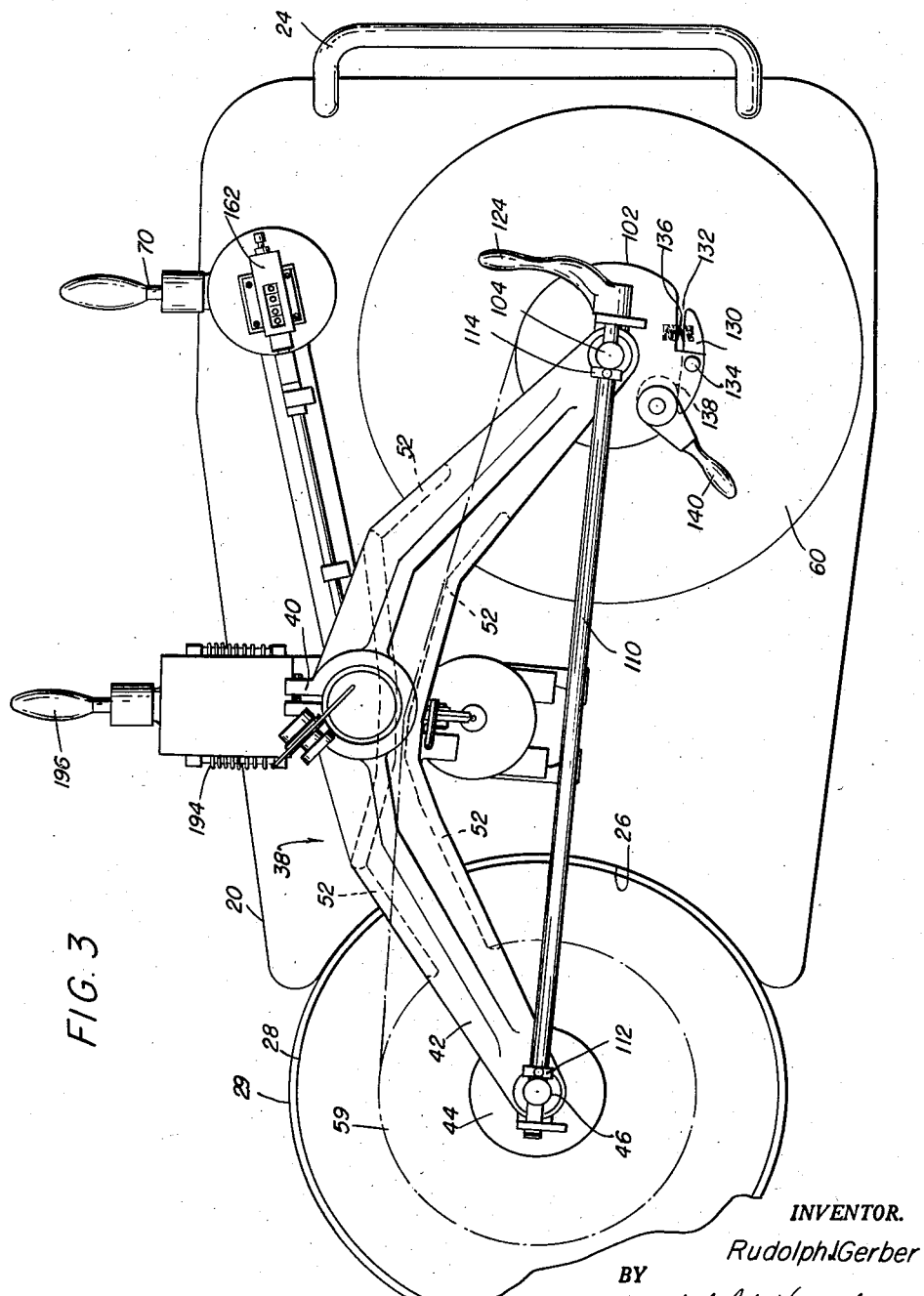

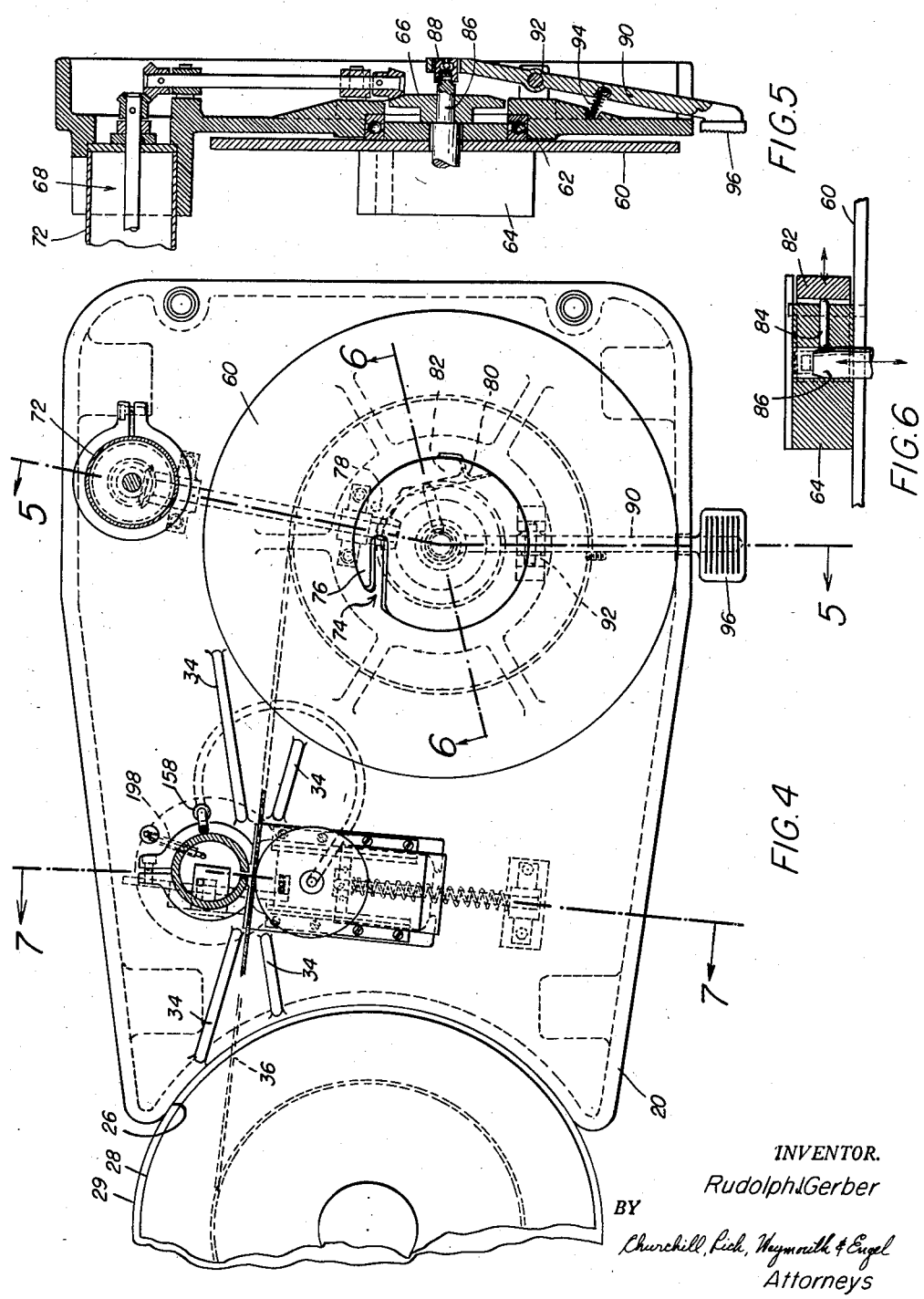

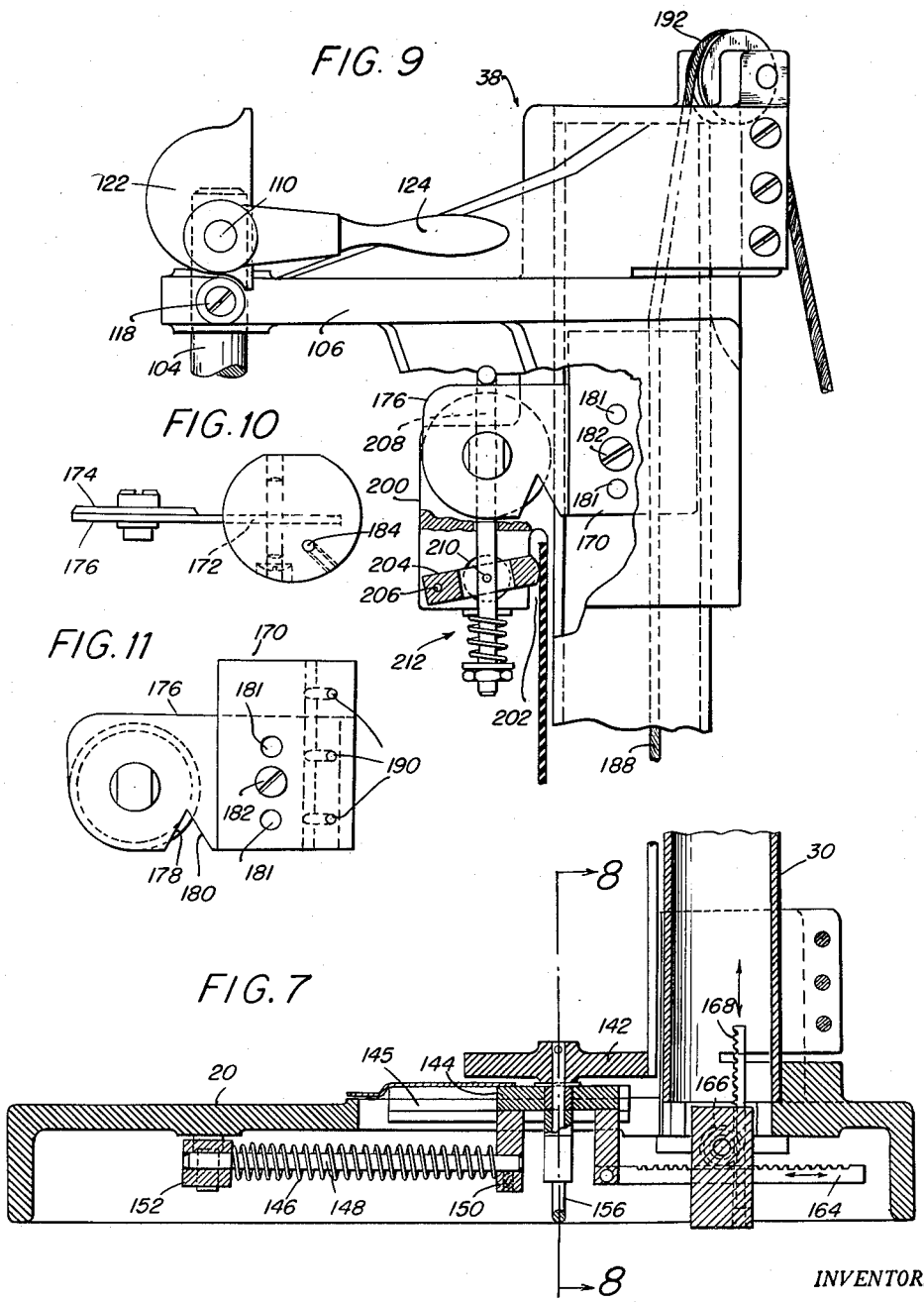

United States Patent Office 2,867,907
Patented Jan. 13, 1959

2,867,907
PORTABLE LINOLEUM MEASURING AND CUTTING DEVICE

Rudolph J. Gerber, Beechhurst, N. Y., assignor, by mesne assignments, to Richard K. Bernstein, New York, N. Y., Alfred J. Bernstein and A. M. Bernstein, both of Trenton, N. J.

Application April 26, 1955, Serial No. 503,882

17 Claims. (Cl. 33—130)

This invention relates to a dispensing device for rolling, measuring and severing flexible floor covering material or the like from a stock roll.

In the merchandising of floor covering materials such as linoleum and carpeting, but more particularly in the case of linoleum, the material comes from the factories in large rolls weighing several hundred pounds. A retailer or wholesaler will have in his display room a complete line of patterns and grades each represented by one or more of these rolls, which, for convenience, shall be referred to hereinafter as a stock roll. When a purchase is made of less than an entire stock roll, particularly on the retail level, it is necessary to withdraw the desired length of material from the roll, cut it and re-roll for handling. It should be obvious that to do the job by hand requires the services of several husky men. This, of course, increases the overhead costs and is otherwise undesirable.

Numerous attempts have been made in the past to simplify and facilitate this dispensing operation by the provision of suitable handling equipment. Among these is an arrangement wherein the stock rolls are mounted for rotation about vertical axes upon individual supporting platforms or turntables resting on the display room floor, and a wheeled support is movable into position adjacent a selected stock roll for winding off a desired quantity of the material on a take-up spindle.

It is an object of the present invention to provide an improved dispensing device of the general type described above, which requires but a single operator, is extremely easy to set up and overcomes the many disadvantages of apparatus heretofore known.

The present invention will be better understood, along with its many advantages, after reading the following detailed description thereof with reference to the accompanying drawings, in which:

Fig. 2 is a side elevational view of the dispensing device of Fig. 1;

Fig. 3 is a top plan view thereof drawn to an enlarged scale;

Fig. 4 is a sectional plan view to an enlarged scale taken along line 4—4 of Fig. 1;

Fig. 5 is a sectional view taken along line 5—5 of Fig. 4, showing details of the mechanism for rotating the lower take-up hub along with the means for actuating the material gripping members of said hub;

Fig. 6 is a sectional view taken along line 6—6 of Fig. 4 showing details of the construction of the hub therein for receiving and gripping the material;

Fig. 7 is a sectional view taken along line 7—7 of Fig. 4 and showing details of the metering mechanism and the motion translating members for disengaging the former;

Fig. 8 is a sectional view taken along line 8—8 of Fig. 7;

Fig. 9 is an enlarged fragmentary side elevational view partly in section of the upper portion of Fig. 1 showing in detail the construction thereof;

Fig. 10 is a top plan view of the cutting means;

Fig. 11 is a front elevational view thereof; and

Fig. 12 is a fragmentary front elevational view of a portion of Fig. 9 showing details of the material retaining means.

Figure 1:
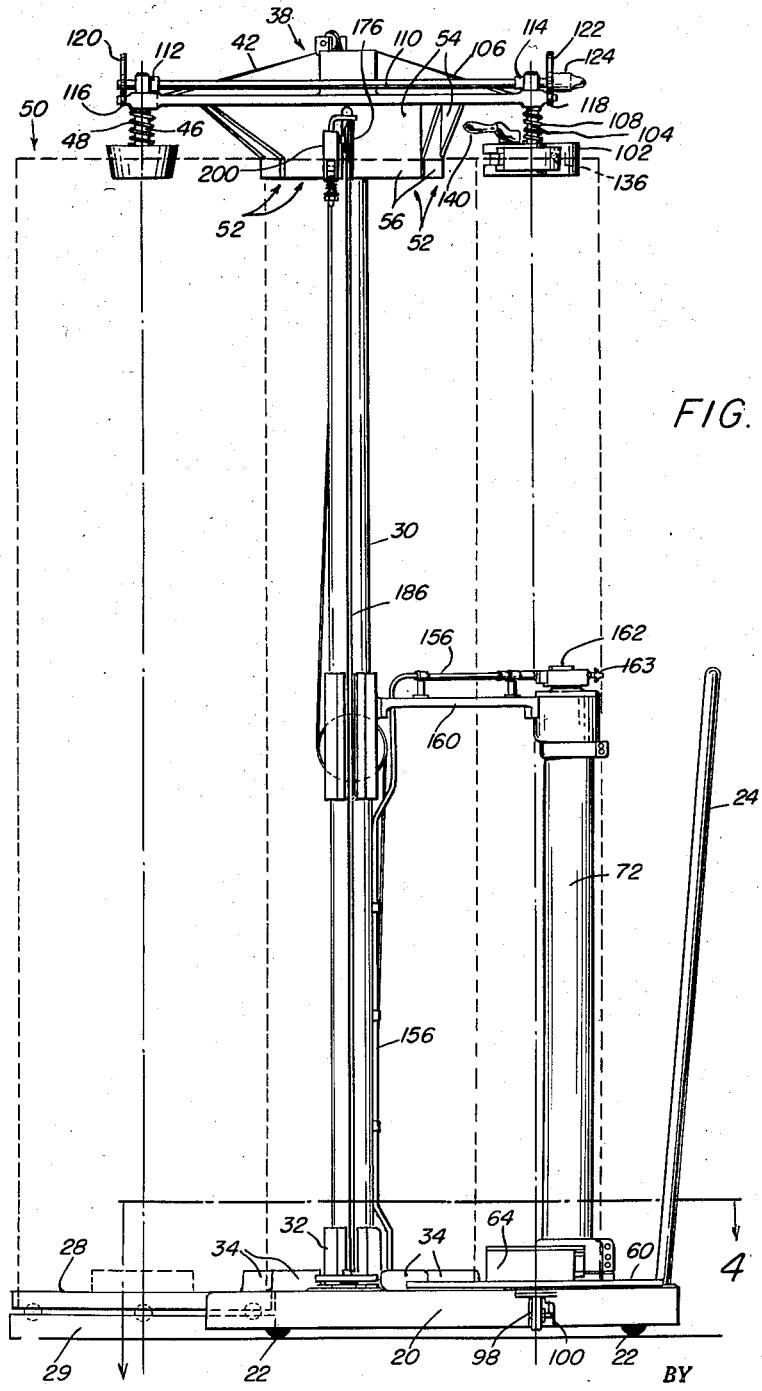
Figure 1 is a front elevational veiw of a dispensing device incorporating the teachings of the present invention.

Referring now to the drawings and more particularly to Figs. 1, 2 and 4, there is shown a dispensing device embodying the features of the present invention. As shown, the device is provided with a horizontal base 20 mounted on casters or rollers 22 and furnished with a handle bar 24 enabling the device to be wheeled from place to place on the display room floor. One end of the base is provided with an arcuate cutout portion 26, as best seen in Fig. 4, for mating engagement with a special turntable or platform 28. The platform 28 is one of a plurality which are provided, each for supporting a separate stock roll of the floor covering material for rotation about a vertical axis. As seen in Fig. 1, the platform 28 is mounted for rotation on its own support 29. An important point to note is that support 29 has a slightly larger diameter than the platform 28. This ensures proper clearance between the platform and the wheeled base 20.

A vertical standard in the form of a hollow column 30 is mounted upon the base 20 and secured thereto by a clamping arrangement 32. Further details of the manner in which the column 30 is secured to the base 20 may be seen in Fig. 7. Positioned on the base 20 integral therewith and immediately in front of the column 30 are a plurality of guides 34. As shown in Fig. 4, the guides 34 provide a converging-diverging channel through which the material to be dispensed is threaded. In Fig. 4 the material is represented by the dashed lines 36. The material is withdrawn from the stock roll supported by the platform 28 and passed between the guides 34 adjacent to the column 30 to the take-up means to be described.

A crossarm in the form of a casting 38 is secured by a suitable clamping means 40 to the upper end of the column 30. As best seen in Fig. 3 the crossarm 38 has one outstretched arm 42 extending over the center of curvature of the cutout portion 26 in the base 20. In this manner the arm 42 will extend over the axis of the platform 28 and thus over the center of the stock roll. A tapered centering hub 44 is journaled on the lower end of a shaft 46 which is mounted for axial movement in the end of arm 42. A compression spring biasing element 48 is disposed on the shaft 46 urging the latter, and thus the centering hub 44, in a downward direction. The mechanism for retaining the shaft 46 in the arm 42 will be described below, in connection with the take-up means. As best seen in Fig. 1, the centering hub 44 is inserted into the upper end of the stock roll, shown in phantom by the lines 50, and serves to stabilize the roll during withdrawal of the material. The crossarm 38 has formed on its lower side a plurality of guide members or rails 52. A careful examination of Figs. 1, 2 and 3 discloses that these guide rails have an upper web portion 54 and a lower operative portion 56 lying above and below, respectively, an imaginary line corresponding to the height of the material being dispensed. The operative portion 56 is arranged to provide a channel similar to and complementing the channel provided by the guides 34 on the base 20.

The take-up means will now be described. Referring to Figs. 1, 2, 4, 5 and 6, a horizontal circular platform or turntable 60 is mounted for rotation about its center on antifriction bearings 62 recessed in the base 20, as best seen in Fig. 5. A take-up hub 64 is provided at the center of the platform 60 rising vertically therefrom as shown in the drawings. The hub 64 and platform 60 are joined on their underside to a bevel gear 66. The gear 66 is connected by means of a plurality of motion translating gears and shafts designated generally by the numeral 68 to a hand crank 70 journaled at the top of a column 72. The location of the crank 70 will be best seen in Figs. 2 and 3. The arrangement is such that rotation of the crank 10 will drive the platform 60 and its central hub 64.

The hub 64 is provided with means for receiving and gripping the lower corner of the leading edge of the material in the form of a slot 74 and jaw 76 pivoted about a pin 78. This is best seen in Fig. 4. A leaf spring 80 is secured to the hub, as shown in Fig. 2, and overlaps the rearward extension 82 of the jaw 76 tending to maintain the jaw in a normally open position. Referring to Figs. 4, 5 and 6, there is provided a pin 84 mounted for horizontal axial movement in the body of the hub 64 and having one end abutting the inner surface of the extension 82 of the jaw 76. Passing freely through a central aperture in the gear 66 and platform 60 is a spindle 86 having its lower end journaled for rotation in a thrust bearing assembly 88 and having its upper end tapered and extending into the hub 64 for operatively engaging the inner end of the pin 84. Coupled to the thrust bearing 88 is one end of a foot lever 90 which is pivotally joined to the base 20 at 92. The pedal end of the lever 90 is biased in the upward direction by a tension spring 94. In this position the spindle 86 is drawn downwardly releasing pressure from the pin 84 and enabling the jaw 76 to assume its open position. When the apparatus is threaded, the lower corner of the material is inserted into the slot 74 and the pedal 96 of the lever 90 is depressed. This elevates spindle 86 giving rise to a camming action upon pin 84, closing the jaws 76 upon the material. As seen in Fig. 1, the base 20 is provided with a slot 98 through which the pedal passes, which slot has an offset shoulder 100. As seen in Fig. 4, the pivoted mounting 92 for the lever 90 has sufficient play to permit lateral displacement of the lever. Thus a sideward movement of the pedal 96 after it has been depressed will shift the lever 90 below the shoulder 100 to maintain the lever in its locking position.

The take-up means is provided with a second hub designated 102 for accepting and gripping the upper corner of the leading edge of the material. The hub 102 is journaled on the end of a shaft 104, the other end of which is vertically mounted for axial movement in the end of the outstretched arm 106 of the cross arm 38. A compression biasing spring 108 is positioned on the shaft 104 urging both it and the associated hub 102 in a downward direction. As seen in Figs. 1 and 3, an operating rod 110 passes through transverse bores in the free ends of both shafts 104 and 46, the latter having been described in connection with the centering hub 44. A pair of collars 112 and 114 are secured to the rod 110 by any suitable means adjacent the respective shafts 46 and 104 to prevent displacement of the rod 110 with respect thereto. Each end of the cross arm 38 is provided with a contact roller 116 and 118, respectively, for engaging corresponding cams 120 and 122 fixedly mounted on the rod 110. The relationship between the cam 122 and its associated roller 118 may be best seen in the enlarged view of Fig. 9, the relationship between cam 120 and roller 116 being the same. An operating handle 124 is secured to one end of the rod 110. It should now be apparent that when handle 124 is actuated it causes rotation of the cams 120 and 122 which bear against their associated rollers, raising the rod 110 upwardly away from the cross arm 38. This in turn draws up the shafts 104 and 46 along with their associated hubs. As seen in Fig. 9, the cams are provided with radially extending portions to limit movement thereof.

Referring to Figs. 1 and 3, it will be seen that the hub 102 has a material receiving slot formed by the cooperation of the articulated jaw 130 and the cutout portion 132. The jaw 130 is pivoted about the pin 134 and urged into its open position by means of a compression spring 136 located above the material line, as best seen in Fig. 1. An eccentric cam 138 is controlled by the hand lever 140 for engaging the rearward extension of jaw 130 to actuate the latter to its locking position.

In a device of this sort, some means must be provided for measuring the length of the material as it is withdrawn from the stock roll. In the present arrangement this takes the form of a friction wheel 142 mounted for rotation at the foot of the column 30. As best seen in Figs. 4, 7 and 8, the friction wheel is mounted on a vertical shaft which is journaled in a saddle 144. The saddle 144 is supported for horizontal movement by the rails 145 and 147. A compression spring 146 disposed on a shaft 148 bears against a lug 150 depending from the saddle 144. As shown in Fig. 7, the shaft 148 has one end secured to the lug 150, whereas the other end is mounted for axial movement through an aperture in a guide block 152 fastened to the underside of the base 20. The action of the spring 146 is to urge the friction wheel 142 against the surface of the material 154 as seen in Fig. 7. The vertical shaft on which the friction wheel 142 is mounted is connected with a flexible cable 156 which passes upwardly through an aperture 158 in the base 20 along the side of column 30 and across a bridging member 160 to the top of the column 72 terminating in an indicator 162. See Fig. 1. The indicator 162 may take any well known form capable of providing readings in terms of feet and inches or other desired units. It is provided, in a well known manner, with a zero resetting knob 163, and it is preferably reversible in its operation.

Referring again to Fig. 7, the saddle 144 has a horizontally disposed geared rack 164 connected to it for imparting horizontal movement thereto. The rack 164 is engaged by a pinion 166 which, in turn, is engaged by a vertically disposed rack 168. As seen in Fig. 7, the upper end of the rack 168 extends up into the column 30 for a short distance. The purpose for this will be explained below in connection with the description of the material cutting means; however, it should be noted that the end of the rack 168 extends above the plane of the friction wheel 142.

Figs. 9, 10 and 11 show the details of the cutting means employed by the present apparatus. The cutting means consists of a cylindrical body member or holder 170 having a diametrically disposed slot 172 for receiving an interchangeable cutting element. The cutting element is formed in two parts, one being the cutting wheel 174 and the other being the wheel carrier 176. As shown in Fig. 11, the carrier 176 has an inverted V shaped notch 178 cut in its lower edge so as to slightly overlap the periphery of the cutting wheel 174. The side 180 of the notch 178 is ground to a cutting edge for cooperating with the cutting wheel 174. The carrier 176 extends into the slot of the body portion 170 and is retained therein by a pair of locating or positioning pins 181 and a bolt or screw designated 182. As seen in Fig. 10, the holder 170 has a through bore 184 longitudinally disposed therein off to one side of the body axis. As seen in Fig. 9, the cutting means is disposed for vertical movement with the holder 170 riding within the column 30 and the cutting element extending outwardly through a longitudinal slot 186 extending from a point near the top of the column 30 down to a point below its junction with the base 20. The column 30 thus serves to guide the cutting means across the material. A cable 188 passes through the bore 184 in the holder 170 and is secured thereto by a plurality of set screws 190. The upper end of the cable passes up through the column 30 and over a pulley 192 back down to a grooved drum 194 which is rotatable by a hand crank 196. The other end of the cable 188 extends downwardly from the cutting means through the column 30 to its lower extremity and around a pulley 198 (which may be seen in Fig. 4) from whence it returns to the drum 194. It is wound on the drum 194 in a well-known manner such that rotation of the drum causes movement of the cable in one direction or the other depending upon the direction of rotation of the drum. In this manner the cutting means can be forcibly actuated along a vertical path downwardly on a cutting stroke from one end of the column 30 to the other, and back on a return stroke.

The function of the two racks 164 and 168 which were described above in connection with the friction wheel 142 can now be readily understood. For accuracy in measurement, the friction wheel 142 is located in the direct path of the cutting means. However, as the holder 170 approaches the lower end of the column 30 and immediately before the cutting wheel carrier 176 encounters the friction wheel 142, the holder 170 engages the upper end of the rack 168 urging it downwardly and transmitting horizontal motion to the saddle 144. In this manner the measuring wheel 142 is automatically withdrawn from its operative position to permit passage of the cutting element. When the cutting means is returned to the top of the column to its starting position, the friction wheel 142 is restored to its operative position by the spring 146.

During a severing stroke, as the cutting wheel 174 and complementary cutting edge 180 work their way downwardly across the width of the floor covering material, some means must be present for resisting buckling of the material. For this purpose, there is provided a retaining device or means positioned adjacent the upper side edge of the material near the cutting line for gripping said edge during the movement of the cutting means. This device is shown in detail in Figs. 9 and 12. Reference should also be had to Figs. 1 and 3 to show its relationship with respect to the crossarm 38 and the other elements at the top of column 30. As seen in Figs. 9 and 12, the crossarm casting 38 has formed integral therewith a small housing 200 which extends laterally therefrom immediately adjacent the longitudinal slot 186 in the column 30. The housing 200 is furnished with a transverse slot or channel 202 for receiving the upper edge of the floor covering material. A gripping jaw 204 has one end pivotally mounted on a pin 206 in the housing 200. As best seen in Fig. 9, the pivotal mounting is such that the opposite end of the jaw 204 is movable into wedging engagement with the far face of the slot 202. An operating rod 208 is vertically mounted in the housing 200 for longitudinal movement therein. Its lower end passes through a slot in the jaw 204 and is pivotally joined to the jaw by means of a pin 210. An external spring 212 mounted on the lower end of the rod 208 urges the rod, and with it the jaw 204, into locking position. Sufficient play in permitted between the rod 208 and the housing 200 to accommodate lateral movement resulting from the arcuate path traversed by pin 210. The upper end of the rod 208 is bent at right angles thereto, as best seen in Fig. 12, so as to cross the path of the wheel carrier 176. The arrangement is such that as the cutting means approaches the upper end of the column 30, the carrier 176 engages the operating rod 208 to release the jaw 204. In this manner there is provided an automatic arrangement responsive directly to operation of the cutting means for gripping the upper edge of the material being dispensed during the severing operation.

The operation of the dispensing device will now be summarized. The operator, having selected a particular stock roll, wheels the device by means of the handle bar 24 up to the selected roll approaching from any convenient direction. As he approaches the roll, he will move the lever 124 so as to elevate the centering hub 44. When he has brought the arcuate portion 26 of the base 20 into contact with the base 29 under the stock roll, he will restore lever 124 to its initial position causing the tapered centering hub 44 to be inserted into the upper end of the stock roll. This serves to stabilize the roll and at the same time locks the dispensing device in position. After having checked the indicator 162 and, if necessary, reset it to zero by means of the knob 163, the operator takes the leading edge of the material and passes the upper edge between the guides 52 through the slot 202 in the retaining means and the lower edge between the guides 34 past the friction wheel 142 of the metering means. The metering means immediately begins to measure the length of the material as it is drawn past the cutting line towards the take-up hubs 64 and 102. The lower corner of the material is inserted into the slot 74 of the lower hub and the upper corner is inserted behind the locking jaw 130 of the upper hub. The operator then depresses the pedal 96 and locks it under the shoulder 100 while at the same time he actuates lever 140, thereby to simultaneously grip both the lower and upper corners of the material. The operator then employs the crank 70 to rotate the take-up means until the indicator 162 shows that he has wound off the desired length of the material. With a reversible indicator the operator can rewind the material if he overshoots his mark. Then without any further operations, he cranks the handle 196 to draw the cutting element downwardly across the width of the material. In proper sequence and automatically the upper edge of the material is gripped by the retaining means 204 and the friction wheel 142 is moved out of the path of the cutting element. The crank 196 is then turned in the opposite direction to restore the cutting means to its initial position at the top of column 30 automatically releasing the retaining means. The roll of dispensed material on the takeup means is secured by ropes or other suitable means. The jaw 130 of the upper hub is released by restoring lever 140 to its initial position. Both the upper hub and the centering hub 44 are now elevated by use of lever 124 which frees the stock roll as well as the second or dispensed roll. The dispensed roll can now be removed by releasing the foot pedal 96. After resetting the indicator 162, the device is again ready for further use.

Throughout the preceding discussion it has been assumed that the width of the material is equal to the spacing between the take-up hubs, but the device is capable of handling material of lesser widths. To explain further, it has been found that the conventional six foot widths of linoleum can be satisfactorily handled in the manner set forth above. The material has sufficient body that it can be wound into a roll by merely driving the lower hub as long as the weight of the material is partially relieved by means of the upper hub. However, a three foot wide strip of linoleum, for example, is to all intents and purposes self-supporting when handled by the device. Thus, it is not necessary to grip or stabilize it at its upper end by means of the upper take-up hub or the centering hub. Likewise, the retaining means employed during cutting of the wider material is no longer required. The principal requirement when lesser widths are handled is that the material be sufficiently heavy-bodied to be substantially self-supporting when placed on edge through the device. Depending upon the self-supporting quality of the material, strips wider than six feet can be handled by increasing the height of the standard 30.

The invention has been described with reference to a preferred embodiment thereof. It is to be understood that minor changes, e. g., motorization, may be made in the details of construction and mode of operation of the device by those skilled in the art without departing from the scope of the appended claims.

What I claim is:

1. A dispensing device for rolling, measuring and severing flexible floor covering material or the like from a rotatable stock roll, comprising rotatable take-up means positionable adjacent the stock roll, said take-up means having a pair of coaxially mounted rotatable hubs, each hub being provided with material receiving and clamping means, said hubs being disposed in spaced relationship for gripping the opposite corners of the leading edge of the material; means coupled directly to one of said hubs for imparting rotary motion thereto for withdrawing said material from the stock roll and forming it into a second roll, the other hub rotating with the material; metering means associated with said take-up means for measuring and indicating the length of material withdrawn from the stock roll; cutting means for severing the withdrawn material from the stock roll when a desired length has been withdrawn, said cutting means being mounted adjacent said take-up means for guided traversal of the entire width of the material; and means for removing said second roll of the material from the take-up means.

2. A dispensing device for rolling, measuring and severing flexible floor covering material or the like from a vertically disposed rotatable stock roll, comprising a horizontal base positionable adjacent the stock roll; a vertical standard mounted on said base; rotatable take-up means having a platform horizontally disposed and mounted on said base for rotation, a first hub rising vertically from the center of said platform for rotation therewith, and a second hub mounted on said standard for rotation with its axis aligned vertically with the axis of said first hub, each of said hubs being provided with material receiving and clamping means, the hubs being disposed for gripping the opposite corners of the leading edge of the material; means coupled to said first hub for imparting rotary motion thereto for withdrawing said material from the stock roll and forming it into a second roll resting upon said platform, said second hub rotating with the material; metering means associated with said take-up means for measuring and indicating the length of material withdrawn from the stock roll; cutting means for severing the withdrawn material from the stock roll when a desired length has been withdrawn, said cutting means being mounted adjacent said take-up means for vertically guided traversal of the entire width of the material; and means for removing said second roll of the material from the take-up means.

3. A dispensing device according to claim 2, wherein said standard comprises a hollow column with a longitudinally disposed slot in the wall thereof; and said cutting means comprises a body member mounted for vertical reciprocation within said column and a cutting element extending laterally from said body member through said slot to operatively engage said material, whereby said standard guides said cutting means and simultaneously supports said second hub.

4. A dispensing device for rolling, measuring and severing flexible floor covering material or the like from a vertically disposed rotatable stock roll, comprising a horizontal base positionable adjacent the stock roll; a vertical standard supported by said base; a crossarm secured to the standard remote from said base; rotatable take-up means having a first hub mounted on said base for rotation about a vertical axis, a first axially movable shaft mounted at one end of said crossarm with its axis aligned vertically with the axis of said first hub, and a second hub journaled on said shaft below said crossarm facing said first hub, each of said hubs being provided with material receiving and clamping means, the hubs being disposed when said second hub occupies its lowermost position for gripping the opposite corners of the leading edge of the material; means coupled to said first hub for imparting rotary motion thereto for withdrawing said material from the stock roll and forming it into a second roll, said second hub rotating with the material; a second axially movable shaft vertically disposed and mounted at the opposite end of said crossarm; a centering hub journalled on said second shaft below said crossarm for engaging the upper end of said stock roll when said second shaft occupies its lowermost position; means for selectively raising said second shaft for inserting and withdrawing said centering hub; metering means associated with said take-up means for measuring and indicating the length of material withdrawn from the stock roll; cutting means for severing the withdrawn material from the stock roll when a desired length has been withdrawn, said cutting means being mounted on said standard for vertically guided traversal of the entire width of the material; and means for selectively raising said first shaft to withdraw said second hub from said second roll for removal thereof.

5. A dispensing device according to claim 4, wherein said standard comprises a hollow column with a longitudinally disposed slot in the wall thereof; and said cutting means comprises a body member mounted for vertical reciprocation within said column and a cutting element extending laterally from said body member through said slot to operatively engage said material, whereby said standard guides said cutting means and simultaneously supports said crossarm with said centering hub and said second hub.

6. A dispensing device according to claim 4, wherein means are provided for resiliently biasing said first and second shafts to their lowermost positions; and wherein said means for selectively raising said first and second shafts comprises a rod passing through the upper ends of both of said shafts above said crossarm, means for rotating said rod, and cam means responsive to rotation of said rod for urging it upwardly away from said crossarm whereby said shafts are raised against the action of said biasing means.

7. A dispensing device for rolling, measuring and severing flexible floor covering material or the like from a rotatable stock roll, comprising rotatable take-up means positionable adjacent the stock roll, said take-up means being provided with means for gripping the leading edge of said material; means for rotating said take-up means for withdrawing said material from the stock roll and forming it into a second roll; metering means associated with said take-up means for measuring and indicating the length of material withdrawn from the stock roll; cutting means for severing the withdrawn material from the stock roll when a desired length has been withdrawn, said cutting means being mounted adjacent said take-up means for guided traversal of the width of the material from one side edge to the other side edge during a cutting stroke and back during a return stroke; retaining means positioned adjacent said one side edge of the material for gripping said edge during the movement of said cutting means thereby to prevent buckling of said material under the pressure of said cutting means on said cutting stroke; means for engaging and disengaging said retaining means at the commencement and termination respectively of said movement of the cutting means; and means for removing said second roll of the material from the take-up means after completion of the severing operation.

8. A dispensing device for rolling, measuring and severing flexible floor covering material or the like from a rotatable stock roll, comprising rotatable take-up means positionable adjacent the stock roll, said take-up means being provided with means for gripping the leading edge of said material; means for rotating said take-up means for withdrawing said material from the stock roll and forming it into a second roll; metering means associated with said take-up means for measuring and indicating the length of material withdrawn from the stock roll; cutting means for severing the withdrawn material from the stock roll when a desired length has been withdrawn; guide means disposed adjacent the path of said material between the stock roll and said take-up means for guiding said cutting means on a cutting and return stroke across the width of the material; retaining means having at least one releasable jaw positioned adjacent said guide means at the side edge of said material from which said cutting stroke commences, said jaw being articulable to grip said side edge;

means for articulating said jaw, said articulating means having at least a part lying in the path of movement of said cutting means for engagement by said cutting means at the end of a return stroke and disengagement thereby at the beginning of a cutting stroke, thereby automatically to secure said material against buckling during a cutting stroke; and means for removing said second roll of the material from the take-up means after completion of the severing operation.

9. A dispensing device for rolling, measuring and severing flexible floor covering material or the like from a rotatable stock roll, comprising rotatable take-up means positionable adjacent the stock roll; said take-up means being provided with means for gripping the leading edge of said material; means for rotating said take-up means for withdrawing said material from the stock roll and forming it into a second roll; metering means for measuring and indicating the length of material withdrawn from the stock roll, said metering means having a friction operating wheel disposed adjacent the path of said material between the stock roll and said take-up means for engaging one surface of said material; cutting means for severing the withdrawn material from the stock roll when a desired length has been withdrawn, said cutting means being mounted for guided traversal of the width of the material along a line intersecting the point of contact between said friction wheel and the surface of said material; means for disengaging said friction wheel from the surface of said material to permit passage of said cutting means; and means for removing said second roll of the material from the take-up means.

10. A dispensing device according to claim 9, wherein said means for disengaging the friction wheel comprises motion translating means coupled to said friction wheel and extending into the path of said cutting means ahead of said friction wheel for engaging said cutting means during its movement, said cutting means being arranged to engage said motion translating means for automatically disengaging said friction wheel during the severing operation.

11. A dispensing device for rolling, measuring and severing flexible floor covering material or the like from a vertically disposed rotatable stock roll, comprising a horizontal base positionable adjacent the stock roll; a hollow column with a longitudinally disposed slot in the wall thereof vertically supported by said base, said slot extending to said base, rotatable take-up means vertically disposed adjacent said column on the side remote from said stock roll and provided with means for gripping the leading edge of said material with the lower side edge of said material near said base; means for rotating said take-up means for withdrawing said material from the stock roll across the slot in said column and forming it into a second roll; metering means for measuring and indicating the length of material withdrawn from the stock roll, said metering means having a friction operating wheel mounted on said base at the foot of said column opposite said slot and movable toward and away from said slot along a path substantially perpendicular thereto, said friction wheel being adapted to engage the surface of said material at said lower side edge when said wheel occupies a position close to said column; biasing means urging said friction wheel toward said column; motion translating means coupled to said friction wheel and extending into the interior of said column, said translating means, when actuated, propelling said friction wheel away from said column; cutting means for severing the withdrawn material from the stock roll when a desired length has been withdrawn, said cutting means having a body member mounted for vertical reciprocation within said column and a cutting element extending laterally from said body member through said slot to operatively engage said material and sever same during its downward movement, said body member including means for engaging at the bottom of its travel said motion translating means to cause actuation thereof, thereby automatically to move said friction wheel out of the path of said cutting element; and means for removing said second roll of the material from the take-up means.

12. A dispensing device according to claim 11, wherein said motion translating means comprises a first rack vertically disposed within said column and extending below the top of said base, a second rack horizontally disposed below the top of said base with one end coupled to said friction wheel and the other end extending past said first rack adjacent thereto, and a common pinion with a horizontal axis engaging both racks for translating motion from one to the other.

13. A dispensing device according to claim 11, wherein said metering means further comprises a remote indicator disposed remotely from said friction wheel and operatively coupled thereto by a flexible cable shaft whereby the indications of said metering means may be more conveniently observed.

14. A dispensing device according to claim 11, further comprising retaining means having at least one releasable jaw positioned adjacent the slot in said column near the upper end thereof, said jaw being articulable to grip the upper side edge of said material; and means for articulating said jaw, said articulating means having at least a part lying in the path of movement of said cutting means for engagement by said cutting means at the top of its travel and disengagement thereby at the beginning of a cutting operation, thereby automatically to secure said material against buckling during said cutting operation.

15. A dispensing device for rolling, measuring and severing flexible floor covering material or the like from a rotatable stock roll, comprising a base positionable adjacent the stock roll; a hollow column with a longitudinally disposed slot in the wall thereof mounted on said base so as to lie in a common plane with the axis of said stock roll; rotatable take-up means having a pair of coaxially disposed rotatable hubs mounted with their axes lying in said plane, each hub being provided with material receiving and clamping means, said hubs being disposed in spaced relationship for gripping the opposite corners of the leading edge of the material, and one of said hubs being supported by said column adjacent one end thereof; means for rotating said hubs for forming a second roll from material withdrawn from said stock roll; cutting means for severing the withdrawn material from the stock roll when a desired length has been withdrawn, said cutting means comprising a body member mounted for reciprocation within said column and a cutting element extending laterally from said body member through said slot to operatively engage said material; and means for removing said second roll of the material from the take-up means.

16. A dispensing device for rolling, measuring and severing flexible floor covering material or the like from a rotatable stock roll, comprising rotatable take-up means positionable adjacent the stock roll, said take-up means being provided with means for gripping the leading edge of said material; means for rotating said take-up means for forming a second roll from material withdrawn from said stock roll; cutting means for severing the withdrawn material from the stock roll when a desired length has been withdrawn, said cutting means being mounted for guided traversal of the width of the material from one side edge to the other side edge during a cutting stroke; retaining means positioned adjacent said one side edge of the material for gripping said edge during the movement of said cutting means thereby to prevent buckling of said material under the pressure of said cutting means on said cutting stroke; means for engaging and disengaging said retaining means before and after, respectively, the cutting stroke of said cutting means; and means for removing said second roll of the material from the take-up means after completion of the severing operation.

17. A dispensing device for rolling, measuring and severing flexible floor covering material or the like from a rotatable stock roll, comprising rotatable take-up means positionable adjacent the stock roll, said take-up means being provided with means for gripping the leading edge of said material; means for rotating said take-up means for forming a second roll from material withdrawn from said stock roll; cutting means for severing the withdrawn material from the stock roll when a desired length has been withdrawn; guide means disposed adjacent the path of said material between the stock roll and said take-up means for guiding said cutting means on a cutting and return stroke across the width of the material; retaining means having at least one releasable jaw positioned adjacent said guide means at the side edge of said material from which said cutting stroke commences, said jaw being articulable to grip said side edge; means for articulating said jaw, said articulating means having at least a part lying in the path of movement of said cutting means for engagement by said cutting means at the end of a return stroke and disengagement thereby at the beginning of a cutting stroke, thereby automatically to secure said material against buckling during a cutting stroke; and means for removing said second roll of the material from the take-up means after completion of the severing operation.

References Cited in the file of this patent

UNITED STATES PATENTS

| | | |
|---|---|---|
| 1,189,482 | Quirk | July 4, 1916 |
| 2,118,751 | Wolfson | May 24, 1938 |
| 2,503,051 | Jeckert et al. | Apr. 4, 1950 |

UNITED STATES PATENT OFFICE

CERTIFICATE OF CORRECTION

Patent No. 2,867,907 January 13, 1959

Rudolph J. Gerber

It is hereby certified that error appears in the printed specification of the above numbered patent requiring correction and that the said Letters Patent should read as corrected below.

Column 7, line 46, strike out "from one side edge to the other side edge during a cutting" and insert instead — tudinally disposed slot in the wall thereof, and said cutting —.

Signed and sealed this 2nd day of June 1959.

(SEAL)
Attest:

KARL H. AXLINE
Attesting Officer

ROBERT C. WATSON
Commissioner of Patents